(12) United States Patent
Bae et al.

(10) Patent No.: US 8,782,561 B2
(45) Date of Patent: Jul. 15, 2014

(54) ONSCREEN FUNCTION EXECUTION METHOD AND MOBILE TERMINAL FOR THE SAME

(75) Inventors: Dong Hwan Bae, Seoul (KR); Dok Shin Lim, Seoul (KR); Min Suk Kim, Seoul (KR); Andrea Kim, Seoul (KR); Joong Hun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 12/027,234

(22) Filed: Feb. 6, 2008

(65) Prior Publication Data
US 2008/0195961 A1    Aug. 14, 2008

(30) Foreign Application Priority Data
Feb. 13, 2007  (KR) .......................... 10-2007-0014764

(51) Int. Cl.
*G06F 15/177*    (2006.01)

(52) U.S. Cl.
USPC .......................................................... 715/835

(58) Field of Classification Search
USPC .......... 715/739, 747, 778, 864, 867, 810, 835
See application file for complete search history.

(56) References Cited

U.S. PATENT DOCUMENTS

| | | | |
|---|---|---|---|
| 5,745,112 A * | 4/1998 | Hirose | 715/769 |
| 5,900,873 A | 5/1999 | Isoda et al. | |
| 6,714,222 B1 | 3/2004 | Bjorn et al. | |
| 6,909,439 B1 | 6/2005 | Amro et al. | |
| 7,188,315 B2 * | 3/2007 | Chen et al. | 715/764 |
| 7,302,649 B2 * | 11/2007 | Ohnishi | 715/838 |
| 7,375,730 B2 * | 5/2008 | Tagliabue et al. | 345/581 |
| 2005/0229118 A1 | 10/2005 | Chiu et al. | |
| 2006/0053384 A1 * | 3/2006 | La Fetra et al. | 715/765 |
| 2006/0107231 A1 * | 5/2006 | Matthews et al. | 715/788 |
| 2006/0200744 A1 * | 9/2006 | Bourke et al. | 715/500.1 |
| 2009/0158193 A1 * | 6/2009 | Chaudhri et al. | 715/779 |

FOREIGN PATENT DOCUMENTS

| | | |
|---|---|---|
| EP | 1 645 944 A1 | 4/2006 |
| JP | 3793740 B2 | 4/2006 |
| JP | 2006-279361 A | 10/2006 |
| KR | 1998-076374 A | 11/1998 |
| KR | 10-2005-0077191 A | 8/2005 |
| KR | 10-2006-0061391 A | 6/2006 |
| KR | 10-2006-0131152 A | 12/2006 |
| KR | 10-0683483 B1 | 2/2007 |

OTHER PUBLICATIONS

Winamp (winamp3, Copyright (c) 1997-2000).*

* cited by examiner

*Primary Examiner* — Thanh Vu
(74) *Attorney, Agent, or Firm* — Jefferson IP Law, LLP (57) ABSTRACT

An onscreen function execution apparatus and method are provided. The apparatus and method allow for intuitively executing various functions by manipulating function widgets arranged on an idle mode screen. The onscreen function execution method of the present invention includes displaying an idle mode screen having a widget box containing at least one widget icon, arranging at least one widget by moving the at least one widget icon representing the at least one widget out of the widget box and positioning the at least one widget icon at a position on the idle mode screen and enabling, if a widget selection command is detected on the at least one widget, the at least one widget. The execution method enables a user to customize an idle mode screen with functional objects.

20 Claims, 9 Drawing Sheets

ONSCREEN FUNCTION EXECUTION METHOD AND MOBILE TERMINAL FOR THE SAME

PRIORITY

This application claims the benefit under 35 U.S.C. §119 (a) of a Korean patent application filed in the Korean Intellectual Property Office on Feb. 13, 2007 and assigned Serial No. 2007-0014764, the entire disclosure of which is hereby incorporated by reference.

BACKGROUND OF THE INVENTION

1. Field of the Invention

The present invention relates to a mobile terminal. More particularly, the present invention relates to an onscreen function execution method of a mobile terminal that is capable of executing useful functions by manipulating widgets.

2. Description of the Related Art

With the advance of computing and wireless technologies, mobile terminals, which may include a mobile phone, a Personal Digital Assistant (PDA), a Portable Multimedia Player (PMP) and the like, are being developed to provide users with personalized features having various embedded application programs in addition to the basic voice communication service. These mobile application programs include a personal scheduler, a short message service (SMS) program, a built-in camera application program, a multimedia player, a documenter reader, games, and the like. Using these application programs, a user can manipulate various types of user data such as pictures taken by the camera, downloaded still and motion pictures, text messages, electronic books, ring tones, sound files (e.g., MP3), game contents, and the like.

However, conventional mobile terminals require a user to input multiple key strokes in order to access data or execute a specific application such that the user frequently feels inconvenienced. That is, the inputting of multiple key strokes required for data access or execution is laborious and creates a critical obstacle to the enjoyment of the useful functions.

In order to reduce manipulation complexity, some mobile terminals are provided with dedicated function keys for executing specific functions. For example, most multi-functional mobile terminals are provided with dedicated function keys for initiating specific functions such as a broadcast receiver, a camera, and MP3 player functions. However, the number of dedicated function keys is limited due to the compact size of mobile phones.

Furthermore, although mobile terminals are more frequently being provided with advanced high resolution displays, the majority of such displays are restricted to displaying a fixed image such as a photo, an animation, or an application object such as a calendar when the phone is in an idle mode. Accordingly, full advantage is not being taken of the display in the idle mode.

SUMMARY OF THE INVENTION

An aspect of the present invention is to address at least the above-mentioned problems and/or disadvantages and to provide at least the advantages described below. Accordingly, an aspect of the present invention is to provide an onscreen function execution method for a mobile terminal that enables a user to customize an idle mode screen with functional objects.

A further aspect of the present invention is to provide an onscreen function execution method for a mobile terminal that is capable of intuitively executing functions on an idle mode screen.

Yet another aspect of the present invention is to provide an onscreen function execution method for a mobile terminal that is capable of executing multiple functions on an idle mode screen simultaneously.

In accordance with an aspect of the present invention, an onscreen function execution method for a mobile terminal having a display is provided. The method includes displaying an idle mode screen having a widget box including at least one widget icon, arranging at least one widget by moving the at least one widget icon representing the at least one widget out of the widget box and positioning the at least one widget icon at a position on the idle mode screen and enabling, if a widget selection command is detected on the at least one widget, the at least one widget.

In an exemplary implementation, the at least one widget is a graphical user interface for interaction with an application program installed in the mobile terminal. As an example, the at least one widget may include an indicator widget, a clock widget, a picture frame widget, a multimedia widget, a document viewer widget, a phonebook widget and the like.

In another exemplary implementation, the enabling of the at least one widget includes, if the at least one widget is the picture frame widget, presenting at least one picture icon representing at least one image stored within the mobile terminal in a file box in response to the widget selection command and applying, if the at least one picture icon is selected and moved to an empty space of the idle mode screen, the image represented by the at least one picture icon as a background image of the idle mode screen.

In yet another exemplary implementation, the enabling of the at least one widget includes presenting a setting box including at least one option item in response to the widget selection command and resetting the at least one widget according to changes of the at least one option item.

In accordance with another aspect of the present invention, an onscreen function execution method for a mobile terminal having a touchscreen is provided. The method includes displaying an idle mode screen having a widget box including at least one widget icon, arranging at least one widget by dragging the at least one widget icon representing the at least one widget out of the widget box and dropping the at least one widget icon at a position on the idle mode screen and enabling, if a widget selection command input by touching the at least one widget is detected, the at least one widget.

In an exemplary implementation, the onscreen function execution method further includes presenting, if a phonebook widget icon is touched, a file box including member icons mapped to respective phone numbers, arranging, if at least one number icon is dragged out of the file box and dropped at a position on the idle mode screen, the at least one member icon at the position and requesting, if the member icon arranged on the idle mode screen is touched, a call to the phone number mapped to the member icon.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Mobile Terminal

Figure 1:
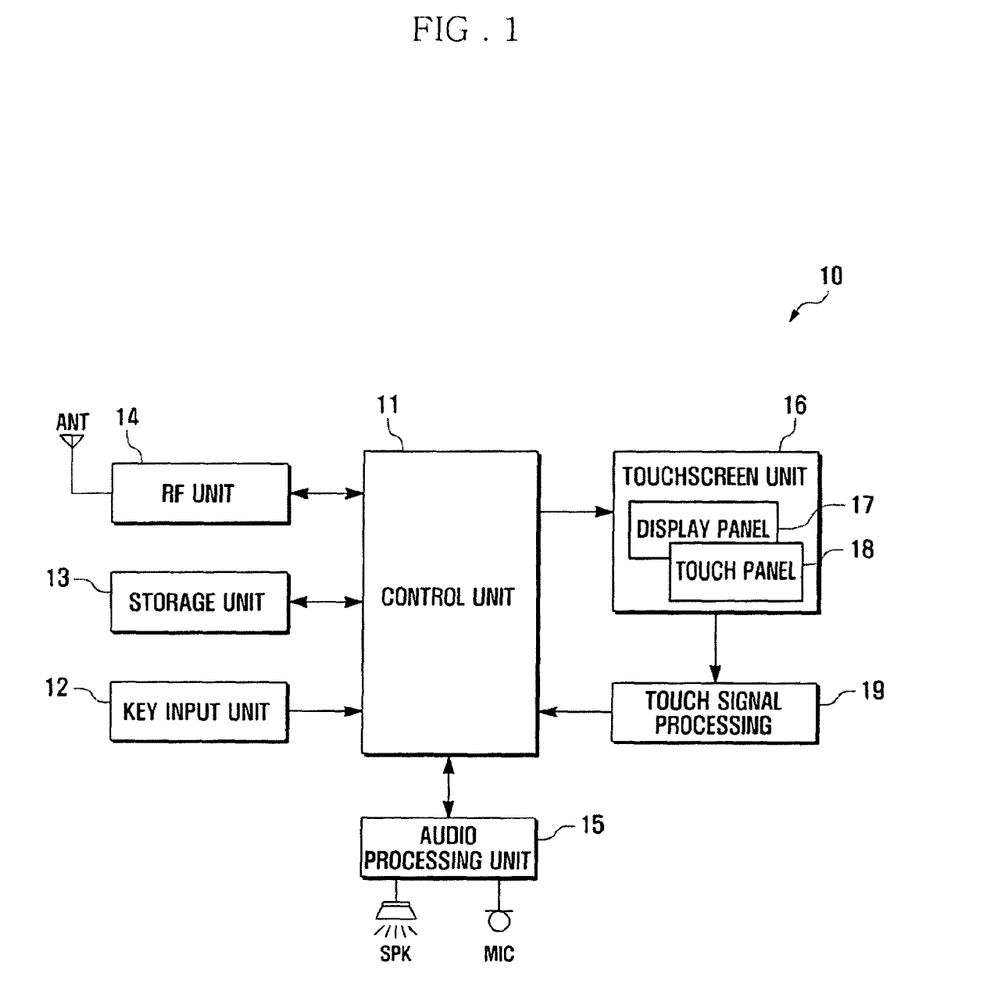
FIG. 1 is a block diagram illustrating a configuration of a mobile terminal providing an onscreen function execution method according to an exemplary embodiment of the present invention.
Figure 2A:
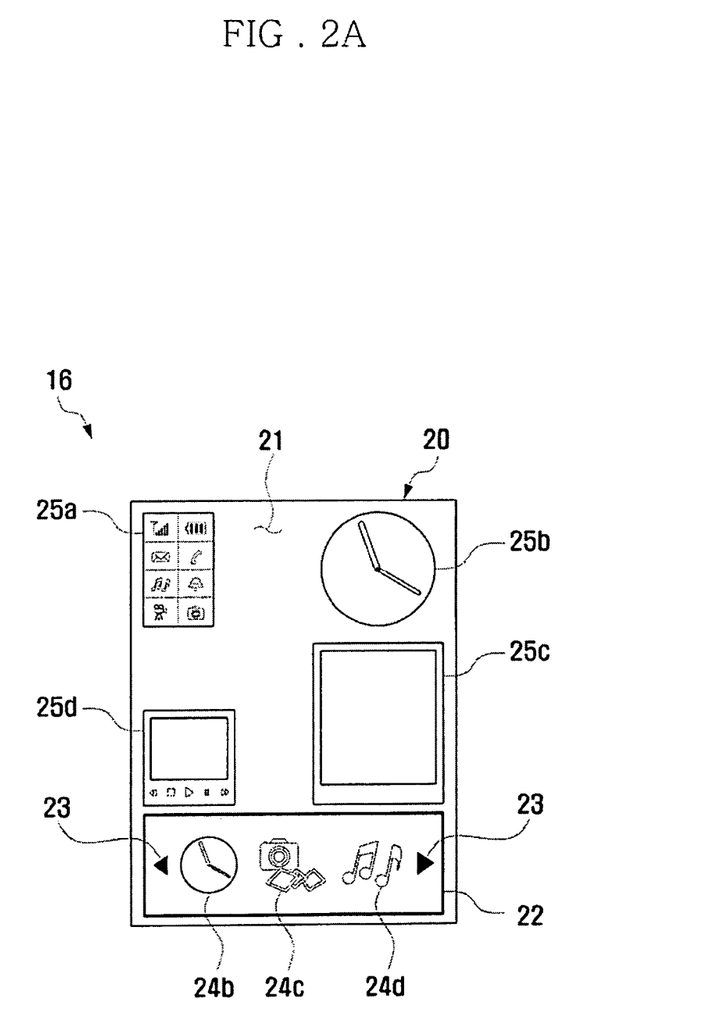
FIGS. 2A to 2C are views illustrating exemplary idle mode screens of the mobile terminal of FIG. 1.
Figure 2B:
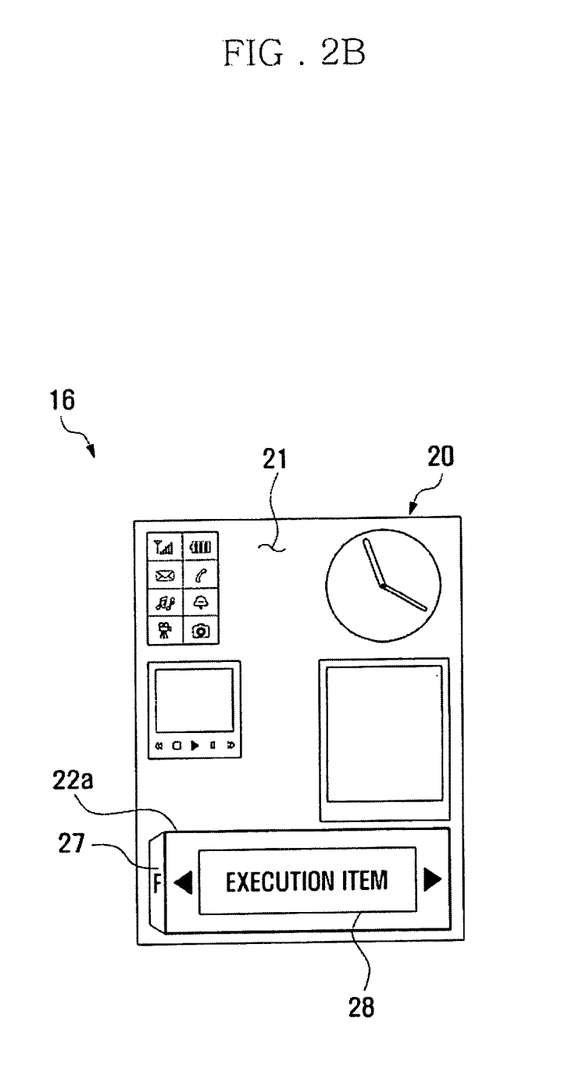
Figure 2C:
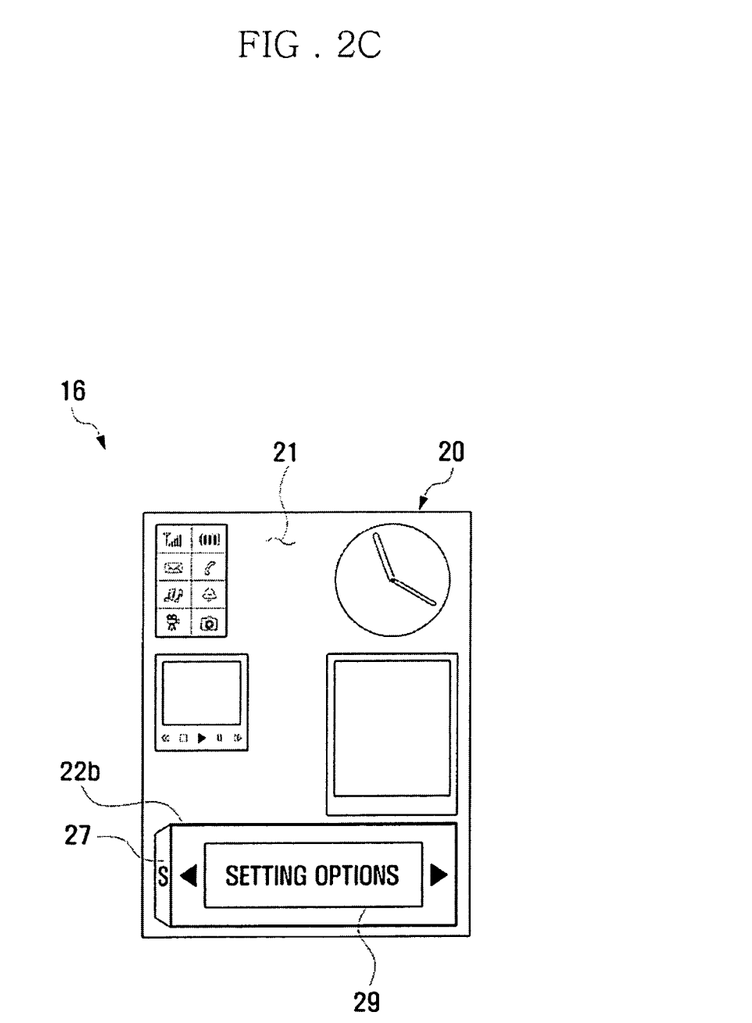

FIG. 1 is a block diagram illustrating a configuration of a mobile terminal providing an onscreen function execution method according to an exemplary embodiment of the present invention, and FIGS. 2A to 2C are views illustrating exemplary idle mode screens of the mobile terminal of FIG. 1.

In an exemplary embodiment as illustrated in FIG. 2A, an idle mode screen 21 is provided with a widget box 22 having a plurality of widget icons 24b, 24c, and 24d located therein. The widget icons 24b, 24c and 24d can be dragged out of the widget box 22 and dropped elsewhere in the idle screen 21 such that a corresponding widget is presented at the drop position. The corresponding widget may then be used for providing information, executing a function and the like.

Referring to FIGS. 1 and 2A to 2C, the mobile terminal 10 includes a control unit 11, a key input unit 12, a storage unit 13, a radio frequency (RF) unit 14, an audio processing unit 15, a touchscreen unit 16 having a display panel 17 and a touch panel 18, and a touch signal processing unit 19.

The control unit 11 is responsible for controlling general operations of the mobile terminal 10. For example, the control unit 11 controls the configuration of an idle mode screen including a plurality of widgets 25a to 25d and execution of the widgets 25a to 25d.

The key input unit 12 is provided with a plurality of alphanumeric keys and functions keys for outputting key sequences to the control unit 11. The key sequences include power on/off sequence, volume adjustment sequence and the like.

The storage unit 13 stores application programs and data generated while executing the application programs. As an example, the storage unit 13 stores widget programs and parameters related to the operations of the widget programs. The storage unit 13 also stores objects such as a phonebook, a widget box 22, a file box 22a, a setting box 22b, widget icons 24a to 24d, and widgets 25a to 25d. In an exemplary implementation, the storage unit 13 includes a Read Only Memory (ROM) device, such as a Flash memory, for storing the application programs and a Random Access Memory (RAM) device such as a DRAM, for storing the data generated during execution of the programs.

The RF unit 14 performs modulation/demodulation and frequency conversion on the signals received and to be transmitted through an antenna (ANT). The radio signal received through the antenna (ANT) is down-converted and demodulated so as to be transferred to the control unit 11.

The audio processing unit 15 digitalizes voice input through a microphone (MIC) and demodulates voice data received from the RF unit 14 so as to be output through a speaker (SPK) in the form of an audible sound.

The touchscreen unit 16 includes a display panel 17 and a touch panel 18 located above the display panel 17. The touchscreen unit 16 may display screens and operation status information of the mobile terminal, play back image data stored within the storage unit 13, generate a signal in response to a touch on the touch panel 18 and outputs the signal to the touch signal processing unit 19. In an exemplary implementation, the signal may comprise an electrical analog signal in response to a touch on the touch panel 18. In a further exemplary implementation, the touchscreen unit 16 presents the widget box 22 containing widget icons 24b to 24d, file box 22a, setting box 22b, and widgets 25a to 25d.

The touch signal processing unit 19 analyzes the signal received from the touchscreen unit 16 and outputs, to the control unit 11, coordinate data indicating a point on the screen where a touch is detected. The touch signal processing unit 19 knows the positions of the widget box 22, file box 22a, setting box 22b, widget icons 24b to 24d, and widgets 25a to 25d on the screen so as to detect which object is selected by a touch. Furthermore, if a finger or stylus movement is detected on the screen, the touch signal processing unit 19 interprets the touch as a drag gesture and transmits a drag command to the control unit 11. In an exemplary implementation, the movement interpreted as a drag gesture includes a touch on the screen, which is maintained by the user while the finger or stylus is concurrently moved across the screen. Alternatively, the touch screen 16 and touch signal processing unit 19 may be used to interpret a first touch followed by a second touch made within a predetermined time and at a different location than the first touch as a drag gesture.

If a command for calling the widget box 22 is input, the control unit 11 controls such that a widget box 22 containing widget icons 24b to 24d appear on the screen. It is understood that although three widget icons 24b to 24d are illustrated, the number of widget icons may vary as can their associated function. The widget box call command can be generated by touching an area on the screen or pushing a specific key. For example, a touch at an edge of the screen or an inward drag gesture on the screen can be interpreted as a widget box call command.

If a finger or stylus touches on a widget icon and moves the widget icon out of the widget box 22 onto an idle mode screen, the control unit 11 controls such that the widget represented by the widget icon appears at a drop position of the widget icon. This is an example of a drag gesture as discussed above.

If at least one widget is selected by a touch on the idle mode screen, the control unit 11 executes a specific function or displays information associated with the widget. For example, the selected widget displays an execution item 28 corresponding to the widget in the form of a file box 22a. If an execution item is selected, the widget executes the execution item 28. At this time, the execution item can be an execution file or execution information. The execution item can be executed by selection behavior or dragging and dropping of the widget. That is, the widget can be selected by touch action thereon and the selected execution item can be moved by drag gesture on the screen. The file box 22a can be placed at the area where the widget box 22 is located, and the execution item 28 can be presented in a hierarchal structure.

The widgets can be re-arranged on the idle mode screen 20 by a drag gesture.

As shown in FIG. 2A, the widget icons 24b to 24d are arranged between a pair of navigation arrows 23 respectively positioned at both horizontal ends of the widget box 22. In an exemplary embodiment, the widget box 22 has a shape of a horizontally elongated bar position at the bottom of the idle mode screen 20. However, this is merely an example and the shape and position of the widget box 22 can be changed. For example, the widget box 22 can be designed such that the widget icons are arranged in multiple rows or in a shape of a vertically elongated bar at one side of the idle mode screen. The widget box can be anchored at one of four sides of the idle mode screen 20 and contain a plurality of widget icons arranged in at least one row. In an exemplary embodiment as illustrated in FIG. 2A, a clock icon 24b, a video icon 24c, and an MP3 icon 24d are arranged between the navigation arrows 23.

As shown in FIGS. 2B and 2C, if a widget is selected on the idle mode screen 20, the widget box 22 is replaced by a file box 22a for presenting an execution item 28 that can be executed with the widget or a setting box 22b that presents setting options 29 for setting parameters associated with the selected widget. That is, the widget box 22 is transformed for another purpose associated with the selected widget.

The file box 22a and setting box 22b are each provided with respective switching tabs 27 at their sides such that the file box 22a and setting box 22b can be switched to each other by selecting the switching tab. In order to inform which box is currently opened, the tabs are labeled with initials, i.e., F for file box and S for setting box.

Each widget icon can be provided in the form a symbolic image or a small widget image. The widget icon can be a still icon or a motion icon.

Each widget is a type of a graphical user interface (GUI) for supporting interaction between the user and a specific application program. As an example only and without limitation, the widgets may include an indicator widget 25a, a clock widget 25b, a picture frame widget 25c, multimedia widget 25d, document viewer widget, and phonebook widget. The picture frame widget 25c can be used to control the showing of still and motion pictures. The multimedia widget 25d can be an MP3 player, a digital broadcast receiver, or a radio. In an exemplary embodiment, the multimedia widget 25d is a MP3 player.

Although the onscreen function execution method is described with touch events on the touchscreen, the present invention is not limited thereto. For example, the onscreen function execution method can be applied to a mobile terminal operating with pointer-based input means.

Exemplary Onscreen Function Execution Method in Idle Mode

Figure 3:
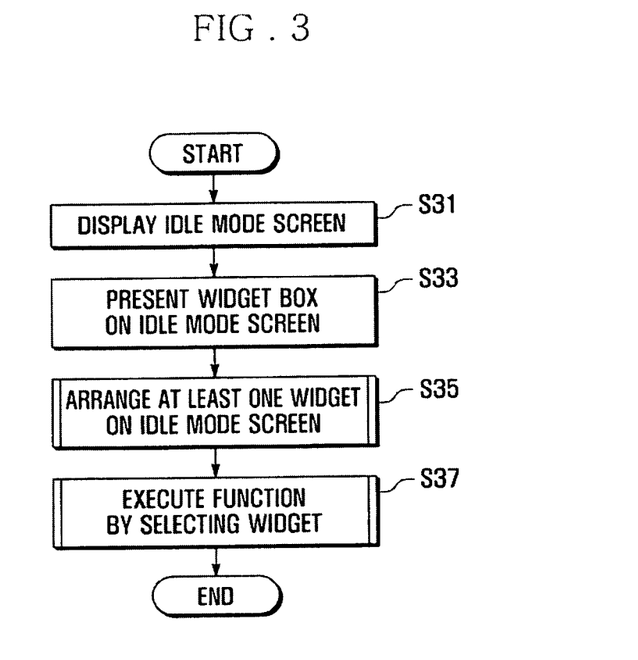
FIG. 3 is a flowchart illustrating an onscreen function execution method according to an exemplary embodiment of the present invention.

FIG. 3 is a flowchart illustrating an onscreen function execution method according to an exemplary embodiment of the present invention.

Referring to FIGS. 1 to 3, if the mobile terminal 10 enters an idle mode, the control unit 11 controls the touchscreen unit 16 to display an idle mode screen 20 in step S31 and presents the widget box 22 on the idle mode screen 20 in step S33. If a widget box call command is input by a key or a touch event, the control unit 11 displays the widget box 22 having one or more widget icons, for example widget icons 24b to 24d, therein.

Next, the control unit 11 performs a widget alignment procedure for presenting widgets on the idle mode screen in step S35. That is, if a drag and drop gesture is detected on a widget icon, the control unit 11 controls such that a widget corresponding to the widget icon is presented at a dropping position on the idle mode screen. If one of the widgets arranged on the idle mode screen is selected, the control unit 11 enables the selected widget such that a program, information, or function that is supposed to be executed with the selection is presented on the idle mode screen 20. The program, information, or function associated with the widget may be enabled simultaneously with the presentation of the widget on the idle mode screen 20 or may be enabled at a later time depending on a user selection. After the widgets are arranged on the idle mode screen, the control unit 11 performs a widget execution procedure for selectively executing the widgets in step S37.

Figure 4:
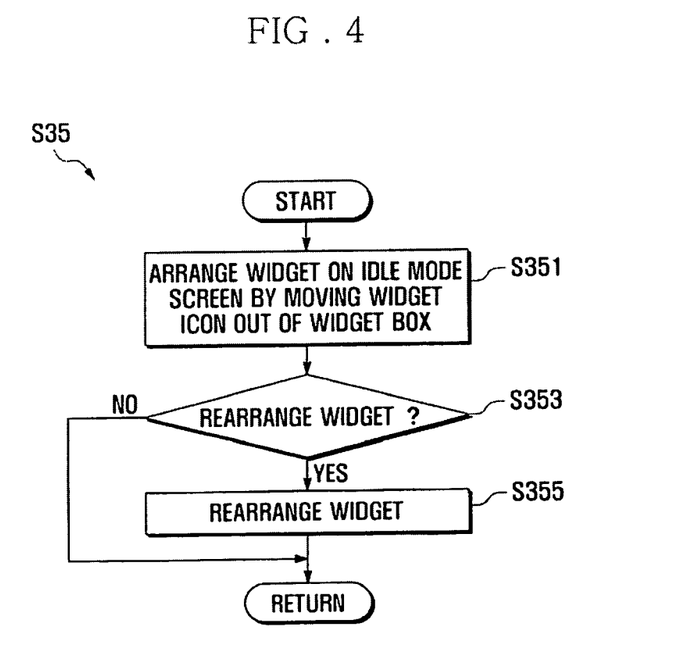
FIG. 4 is a flowchart illustrating an exemplary widget alignment procedure of the onscreen function execution method of FIG. 3.

The widget alignment procedure of step S35 is described hereinafter in more detail with reference to FIGS. 1 to 4. FIG. 4 is a flowchart illustrating an exemplary widget alignment procedure of the onscreen function execution method of FIG. 3.

A widget can be arranged on the idle mode screen by dragging a widget icon representing the widget out of the widget box 22 and dropping the widget icon at a position on the idle mode screen in step S351.

Next, the control unit 11 determines whether a drag command is detected on the widget in step S353. If a drag command is detected, the control unit 11 determines a point of the drag gesture and locates the widget at the end point of the drag gesture such that the widget is rearranged on the idle mode screen in step S355. If a drag command is not detected in step S353, the controller ends the subroutine and proceeds to step S37.

Figure 5:
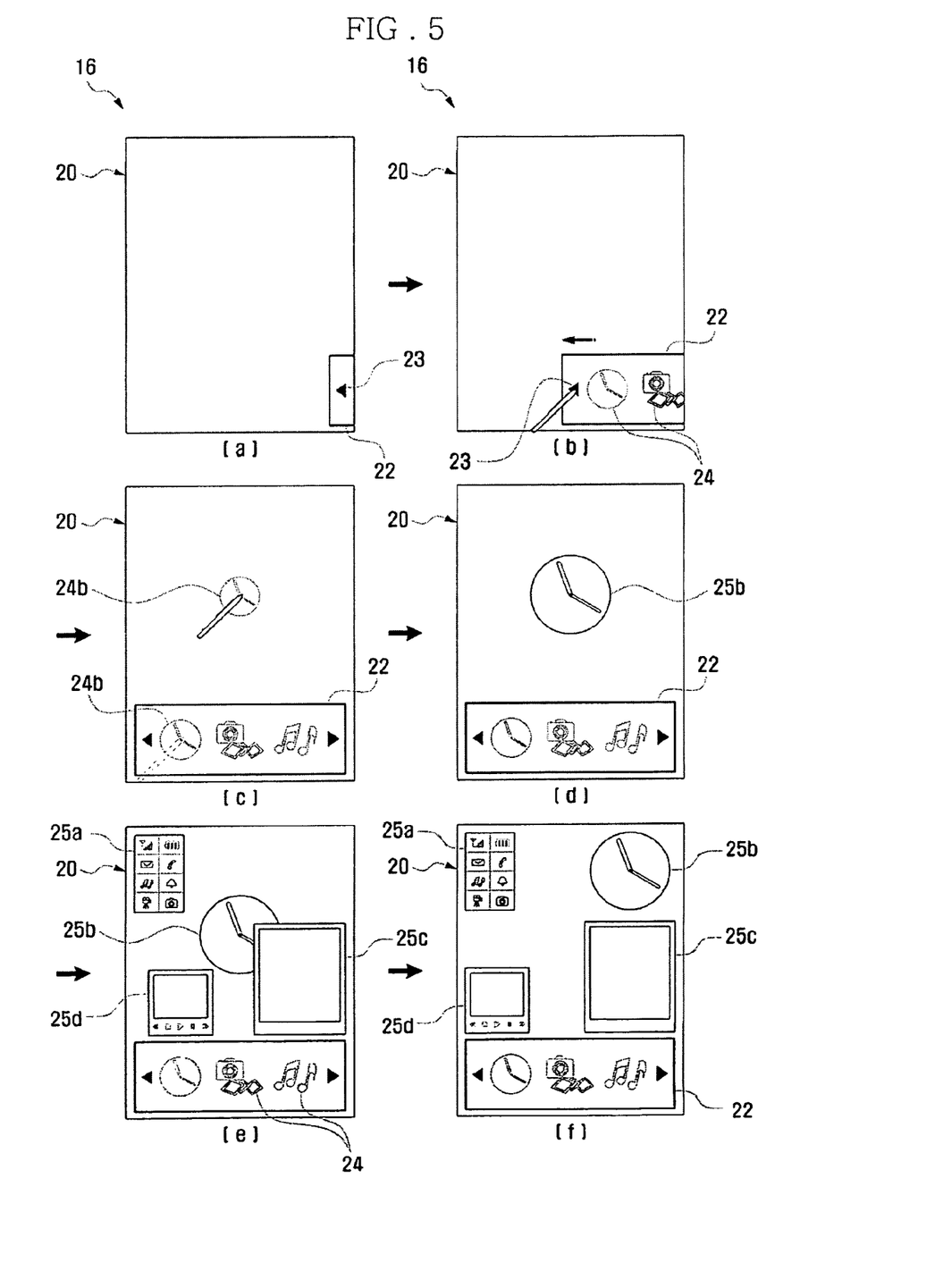
FIG. 5 are exemplary views illustrating steps of the onscreen function execution method of FIG. 3.

FIG. 5 is a diagram illustrating steps of an exemplary onscreen function execution method of FIG. 3. In FIG. 5, exemplary illustrations of steps S31 to S35 of the onscreen function execution method of FIG. 3 are depicted.

Referring to FIGS. 1 to 5, if the mobile terminal 10 enters the idle mode, the control unit 11 controls the touchscreen unit 16 to display an idle mode screen 20 as illustrated in screen image (a) of FIG. 5. The widget box 22 may appear at the bottom right corner of the idle mode screen 20, for example by including a navigation arrow 23 as is illustrated. However, the widget box 22 can be configured to appear from anywhere and in any shape on the idle mode screen 20.

The widget box 22 can be dragged while touching on or near the navigation arrow 23 into the idle mode screen 20 as illustrated in screen image (b) of FIG. 5. The movement of the widget box 22 can be triggered by touching the navigation tip 23. However, a widget box call command for presenting the hidden widget box 22 is not limited thereto. For example, the hidden widget box 22 can be called to appear by a specific key input, such as an arrow key on the key input unit, or a soft key.

As the widget box 22 is dragged so that a greater volume of the widget box 22 appears, widget icons 24 also begin to appear.

If a widget icon (in this example, a clock widget icon 24b) is selected and dragged out of the widget box 22 and then dropped at a position on the idle mode screen 20 using a stylus as illustrated in screen image (c) of FIG. 5, the control unit 11 controls such that a clock widget 25b is presented at the drop position as illustrated in screen image (d) of FIG. 5.

In this manner, multiple widgets represented by the widget icons 24 in the widget box 22 can be arranged on the idle mode screen 20 as illustrated in screen image (e) of FIG. 5. Screen image (e) shows an indicator widget 25a, clock widget 25b, picture frame widget 25c, and multimedia widget 25d.

The widgets can be rearranged on the idle mode screen by a drag and drop gesture using the stylus or finger.

Figure 6:
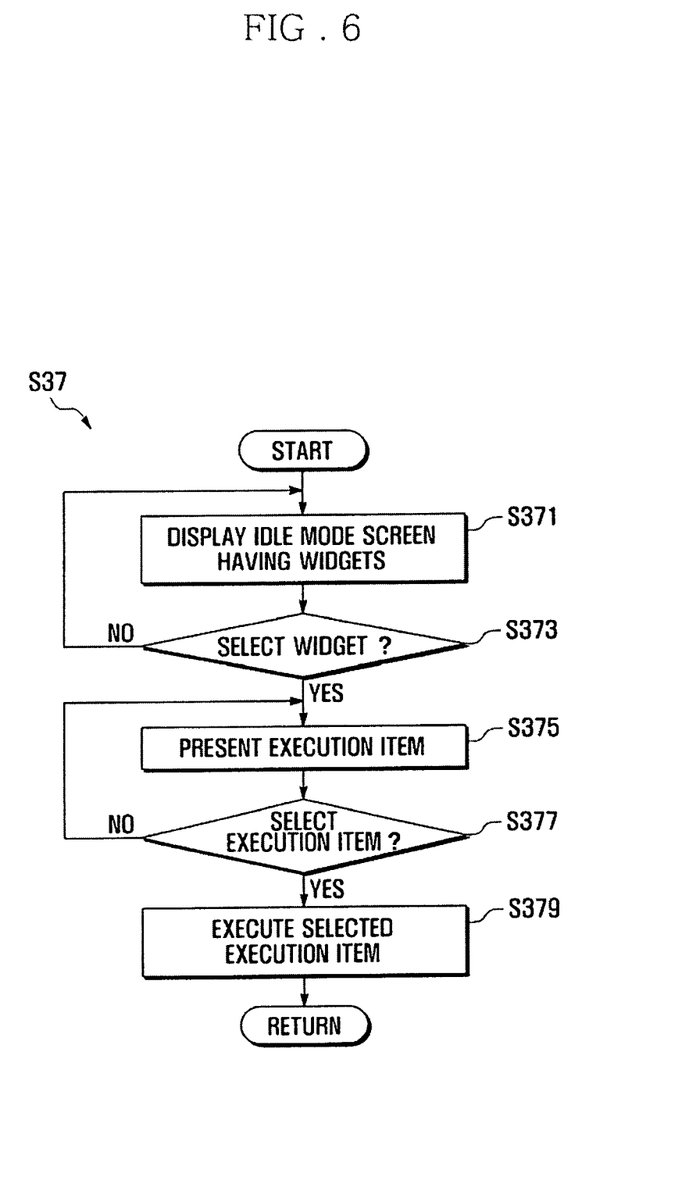
FIG. 6 is a flowchart illustrating an exemplary widget execution procedure of the onscreen function execution method of FIG. 3.

A widget execution procedure (FIG. 6) is described hereinafter in more detail with reference to FIGS. 1 to 6. FIG. 6 is a flowchart illustrating an exemplary widget execution procedure of the onscreen function execution method of FIG. 3.

While operating in the idle mode, the control unit 11 controls the touchscreen unit 16 to display the idle mode screen having widgets arranged in step S371.

Next, the control unit 11 determines whether a selection command is detected on a widget in step S373. If a selection command is detected, the control unit 11 controls such that execution items associated with the selected widget appear in step S375. That is, the control unit 11 controls such that the widget box 22 is replaced by a file box 22a having a plurality of execution items. If no selection command is detected, the control unit 11 maintains the idle mode screen as it is.

Next, the control unit 11 determines whether a selection command is detected on an execution item in step S377. If a selection command is detected, the control unit 11 controls the selected execution item to take an appropriate action in step S379. The selection command can be generated by dragging the execution item onto the corresponding widget as well as by touching the execution item.

Figure 7:
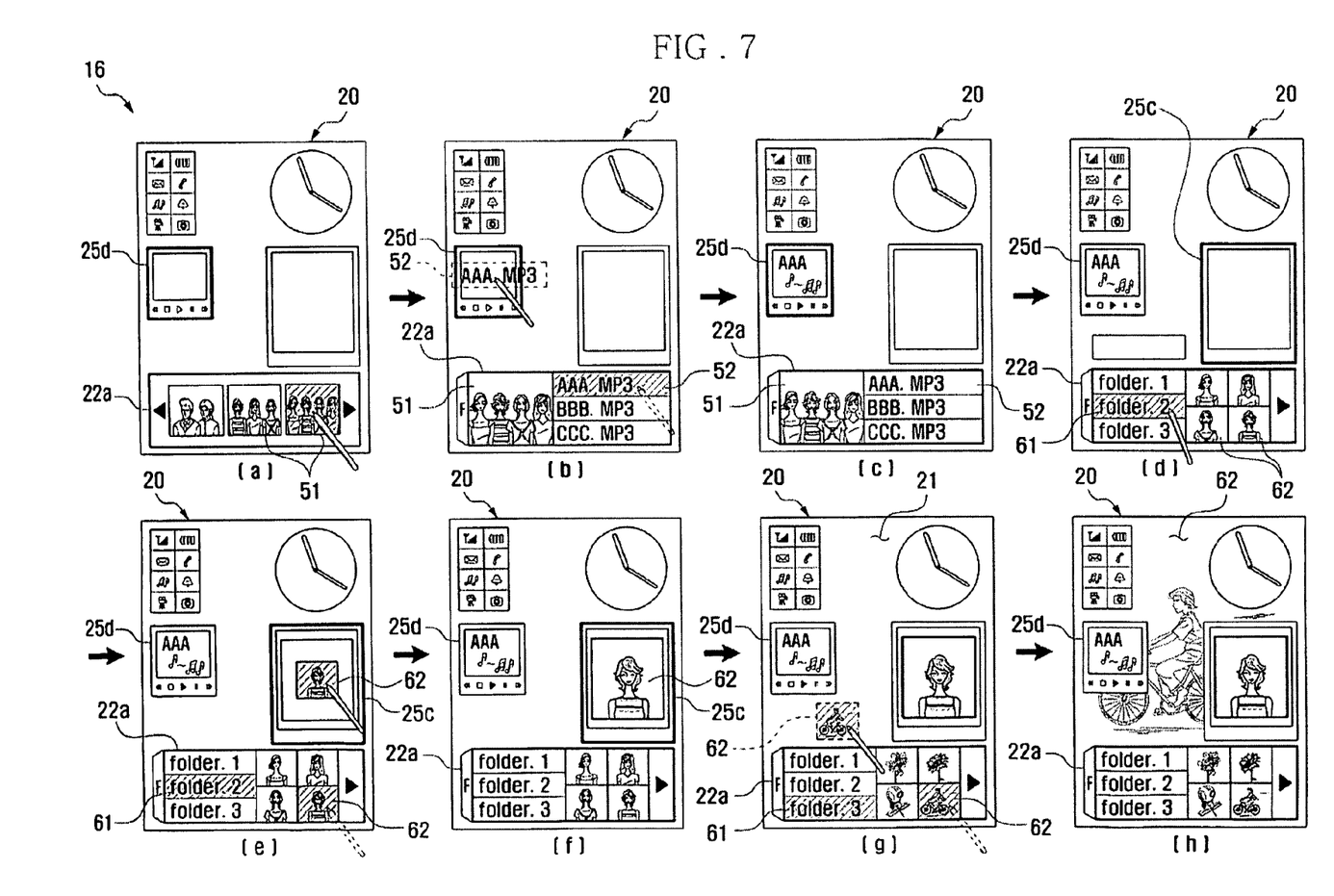
FIG. 7 is a diagram illustrating steps of die widget execution procedure of FIG. 6 according to an exemplary embodiment of the present invention.
Figure 8:
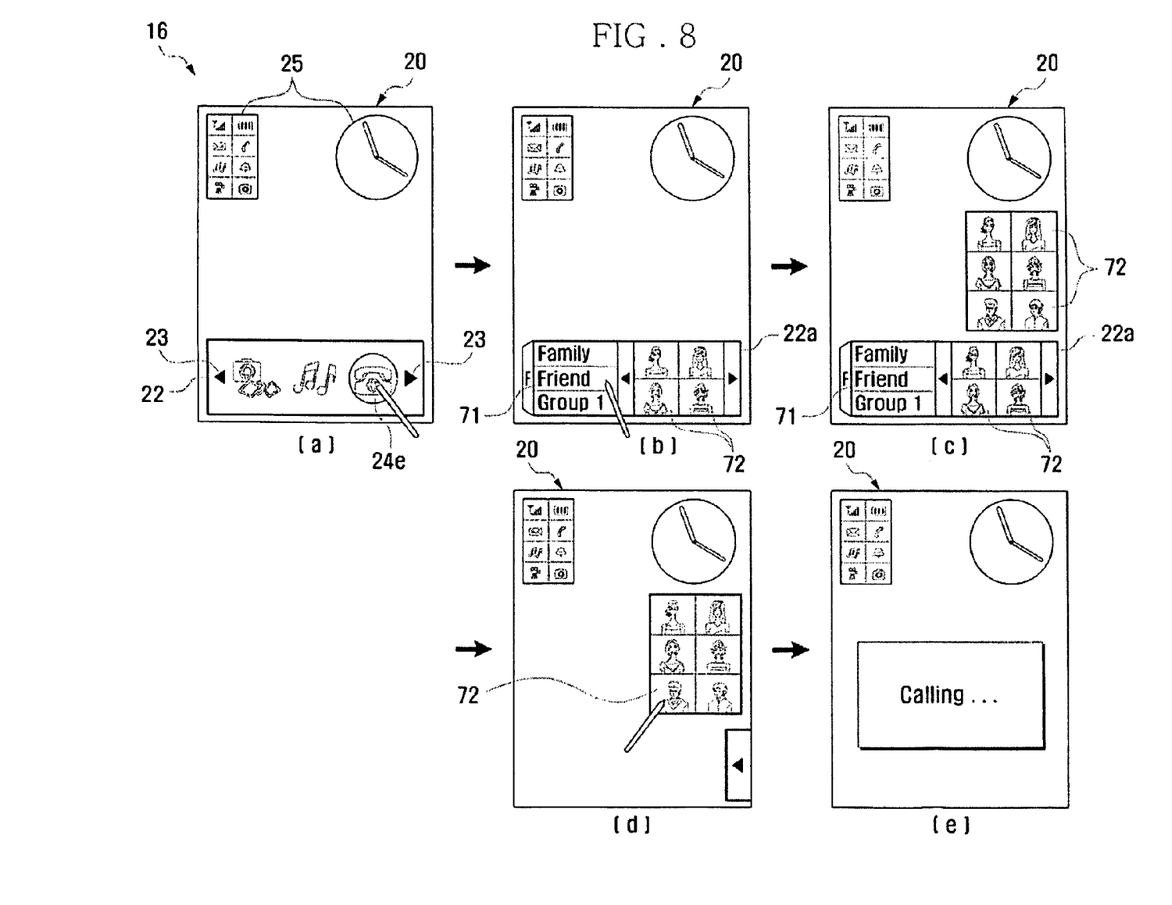
FIG. 8 is a diagram illustrating steps of the widget execution procedure of FIG. 6 according to another exemplary embodiment of the present invention.

FIGS. 7 and 8 are exemplary diagrams illustrating steps of the widget execution procedure of the onscreen function execution method of FIG. 6.

Example of a Widget Execution Procedure

Referring to FIG. 7, the idle mode screen 20 shows multiple widgets including an MP3 player widget 25d as illustrated in screen image (a) of FIG. 7. If the MP3 player widget 25d is selected by the stylus, the control unit 11 controls such that a file box 22a, containing MP3 items such as MP3 albums, is displayed. For example, each MP3 album appears with a thumbnail 51. In an exemplary implementation, the thumb nail is a reduced size version of an album cover image, and the MP3 items are the execution items belonging to the MP3 album.

If an MP3 album is selected by the stylus, for example if a thumbnail 51 is selected, the control unit 11 presents MP3 items 52 as shown in screen image (b) of FIG. 7. The MP3 items 52 can be presented in the form of a list beside the corresponding selected thumbnail 51.

If an MP3 item 52 is selected, for example if it is dragged and dropped onto the MP3 player widget 25d, the MP3 player widget 25d plays the MP3 file corresponding to the MP3 item as show in screen image (c) of FIG. 7. In a case that multiple MP3 items are dropped onto the MP3 player widget 25d, the MP3 player widget plays the MP3 files according to a preset playback option. In an exemplary embodiment, an MP3 file represented by "AAA.MP3" item is dropped onto the MP3 player widget 25d. Also, an MP3 album can be dragged and dropped onto the MP3 player widget 25d by dragging and dropping thumbnail 51. In this case, the MP3 player widget 25d plays all MP3 files belonging to the MP3 album in a preset playback option. Alternatively, in either example, a user may alter the playback arrangement or may choose that the playback be random.

While the MP3 player widget 25d plays the MP3 files, another widget can be executed as shown in screen images (d) to (h) of FIG. 7.

If a picture frame widget 25c is selected while the MP3 player widget 25d plays an MP3 file, the control unit 11 controls such that the file box 22a displays image folders 61 as shown in screen image (d) of FIG. 7. If one of the image folders 61 is selected by the stylus, the control unit 11 controls such that images 62, contained in the selected folder, are displayed in the form of thumbnails. In this case the images are execution items. If a thumbnail of an image belonging to the selected folder is dragged out of the file box 22a and dropped onto the picture frame widget 25c as shown in screen image (e) of FIG. 7, the control unit 11 controls such that the image corresponding to the thumbnail fills a frame of the picture frame widget 25c as shown in screen image (f) of FIG. 7. In a case that multiple thumbnails are dragged and dropped onto the picture frame widget 25c, the picture frame widget 25c shows the pictures corresponding to the thumbnails in a sequential order with a predetermined time interval, i.e., in the form of a slide show. Alternatively, the pictures may be shown sequentially at the selection of the user.

While some widgets are activated, a background image of the idle mode screen can be changed. An example of changing the background image is described with reference to screen images (g) and (h) of FIG. 7. If the empty space of the idle mode screen 20, i.e. the background image of the idle mode screen 20 is touched by the stylus, the control unit 11 controls such that the file box 22a shows file folders 61 as shown in screen image (g) of FIG. 7. If one of the file folders is selected by the stylus, the control unit 11 controls such that thumbnails 62 representing background images belonging to the selected file folder are shown beside a folder list.

If a thumbnail is dragged and dropped onto the empty space of the idle screen image, the control unit 11 changes the background image with a new background image 62 represented by the selected thumbnail as shown in screen image (h) of FIG. 7.

Another Example of a Widget Execution Procedure

In an exemplary embodiment described below, the widget execution procedure is described mainly in association with a phonebook widget.

Referring to FIG. 8, the idle mode screen 20 shows multiple widgets 25 and widget box 22. The widget box 22 is presented by touching and dragging using the navigation arrow 23 of the hidden widget box 22 as explained earlier. The widget icons contained in the widget box 22 can be shifted such that they are shown or hidden by using the navigation arrows 23. If a phonebook icon 24e is selected by touch, the control unit 11 controls such that multiple member groups are presented in a file box 22a as shown in screen image (b) of FIG. 8. If a specific group 71 is selected by touch, the control unit 11 controls such that thumbnails of pictures of members belonging to the selected group are displayed. Although the groups 71 are shown in the form of group labels in screen image (b) of FIG. 8, the groups can be presented in the form of thumbnails. Also, the thumbnails of the member's pictures can be presented in the form of a text label list or characters. The thumbnail of each member's picture is respectively mapped to the member's address. The address of each member includes at least one phone number and/or at least one e-mail address.

If at least one member's thumbnail 72 is dragged out of the file box 22*a* and dropped at a position on the idle mode screen 20, the control unit 11 controls such that the thumbnail 72 is presented at the position as shown in screen image (c) of FIG. 8. Also, a specific group can be dragged out of the file box 22*a* and dropped at a position on the idle mode screen. In this case, the control unit 11 controls such that a thumbnail representing the group or the thumbnails of the members belonging to the group is presented at the dropping position.

If one of the at least one thumbnail presented outside the file box 22*a* is selected by the stylus as shown in screen image (d) of FIG. 8, the control unit 11 makes a call to the member corresponding to the selected thumbnail as shown in screen image (e) of FIG. 8. In this manner, the user can intuitively select a member to make a call.

The phonebook widget can be used when transmitting a text message and e-mail as well as for making a voice call.

Although the onscreen function execution method is explained with an example in which an execution item selected from a file box appearing by selecting a widget icon from a widget box is executed, the present invention is not limited to this execution procedure. For example, the widget 25 can be reset by changing options 29 presented in a setting box 22*b* which appears after selecting a widget 25.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the onscreen function execution method of the present invention allows a user to customize the appearance of an idle mode screen with widgets providing useful information.

Also, the onscreen function execution method of the present invention enables a user to intuitively execute various functions of the mobile terminal by manipulating widgets presented on a touchscreen in the idle mode, resulting in improvement of user convenience. Furthermore, an onscreen function execution method of the present invention is advantageous since multiple functions can be executed simultaneously.

What is claimed is:

1. An onscreen function execution method for a mobile terminal having a display, the method comprising:
    displaying an idle mode screen having a widget box containing at least one widget icon;
    arranging on the idle mode screen at least one widget by moving the at least one widget icon representing the at least one widget out of the widget box and positioning and displaying the at least one widget icon at a position on the idle mode screen;
    executing at least one file associated with the at least one widget on the widget box, if a widget selection command is detected on the at least one widget positioned on the idle mode screen, by keeping the at least one widget displayed on the idle mode screen in addition to displaying the at least one executable file associated with the at least one widget displayed on the idle mode screen in response to the widget selection command; and
    selecting the executable file associated with the at least one widget displayed on the idle mode screen and moving the selected executable file onto the at least one widget icon positioned on the idle mode screen.

2. The onscreen function execution method of claim 1, further comprising rearranging the at least one widget by selecting and moving the at least one widget on the idle mode screen.

3. The onscreen function execution method of claim 2, wherein the widget icon comprises at least one of an image symbolizing a function of the at least one widget and a thumbnail as a minimized version of the widget.

4. The onscreen function execution method of claim 1, further comprising:
    executing the at least one executable file that is at least one of selected and moved onto the at least one widget icon.

5. The onscreen function execution method of claim 4, wherein the at least one executable file associated with the selected widget is displayed in an area where the widget box is located, and the at least one executable file is presented in a hierarchical structure.

6. The onscreen function execution method of claim 1, wherein the at least one widget comprises a graphical user interface for interaction with an application program installed in the mobile terminal.

7. The onscreen function execution method of claim 6, wherein the at least one widget comprises at least one of an indicator widget, a clock widget, a picture frame widget, a multimedia widget, a document viewer widget and a phonebook widget.

8. The onscreen function execution method of claim 7, wherein, if the at least one widget comprises the picture frame widget, the enabling of the at least one widget comprises:
    presenting at least one picture icon representing at least one image stored within the mobile terminal in response to the widget selection command; and
    applying, if the at least one picture icon is selected and moved to an empty space of the idle mode screen, the image represented by the at least one picture icon as a background image of the idle mode screen.

9. The onscreen function execution method of claim 1, wherein the enabling of the at least one widget comprises:
    presenting a setting box containing at least one option item in response to the widget selection command; and
    resetting the at least one widget according to changes of the at least one option item.

10. An onscreen function execution method for a mobile terminal having a touchscreen, the method comprising:
    displaying an idle mode screen having a widget box containing at least one widget icon;
    arranging on the idle mode screen at least one widget by dragging the at least one widget icon representing the at least one widget out of the widget box and dropping and displaying the at least one widget icon at a position on the idle mode screen;

executing at least one file associated with the at least one widget on the widget box, if a widget selection command input by touching the at least one widget displayed on the idle mode screen is detected, by keeping the at least one widget displayed on the idle mode screen in addition to displaying the at least one executable file associated with the at least one widget displayed on the idle mode screen in response to the widget selection command; and selecting the executable file associated with the at least one widget displayed on the idle mode screen and dragging the selected executable file onto the at least one widget icon positioned on the idle mode screen.

11. The onscreen function execution method of claim 10, further comprising rearranging the at least one widget by touching and dragging the at least one widget on the idle mode screen.

12. The onscreen function execution method of claim 11, wherein the displaying of the idle mode screen comprises presenting the widget box by at least one of touching and dragging an end of the widget box appearing at an edge of the idle mode screen.

13. The onscreen function execution method of claim 12, wherein the widget icon comprises at least one of an image symbolizing a function of the at least one widget and a thumbnail as a minimized version of the widget.

14. The onscreen function execution method of claim 11, further comprising:
    executing the at least one executable file that is at least one of selected and dragged onto the at least one widget icon.

15. The onscreen function execution method of claim 14, wherein the at least one executable file associated with the at least one selected widget is displayed in an area where the widget box is located, and the at least one executable file is presented in a hierarchical structure.

16. The onscreen function execution method of claim 10, wherein the at least one widget comprises a graphical user interface for interaction with an application program installed in the mobile terminal.

17. The onscreen function execution method of claim 16, wherein the at least one widget comprises at least one of an indicator widget, a clock widget, a picture frame widget, a multimedia widget, a document viewer widget and a phonebook widget.

18. The onscreen function execution method of claim 17, wherein, if the at least one widget comprises the picture frame widget, the enabling of the at least one widget comprises:
    presenting at least one picture icon representing at least one image stored within the mobile terminal in response to the widget selection command; and
    applying, if the at least one picture icon is pointed and moved to an empty space of the idle mode screen, the image represented by the at least one picture icon as a background image of the idle mode screen.

19. The onscreen function execution method of claim 18, further comprising:
    presenting, if the phonebook widget icon is touched, a file box containing member icons mapped to respective phone numbers;
    arranging, if at least one member icon is dragged out of the file box and dropped at a position on the idle mode screen, the at least one member icon at the position; and
    requesting, if the at least one member icon arranged on the idle mode screen is touched, a call to the phone number mapped to the at least one member icon.

20. The onscreen function execution method of claim 10, wherein the enabling of the at least one widget comprises:
    presenting a setting box containing at least one option item in response to the widget selection command; and
    resetting the at least one widget according to changes of the at least one option item.

* * * * *